(12) United States Patent
Furukawa et al.

(10) Patent No.: US 7,933,514 B2
(45) Date of Patent: Apr. 26, 2011

(54) CAMERA SYSTEM AND DIGITAL CAMERA

(75) Inventors: Shinichi Furukawa, Funabashi (JP);
Yasushi Ogino, Kawasaki (JP)

(73) Assignee: Nikon Corporation, Tokyo (JP)

( * ) Notice: Subject to any disclaimer, the term of this patent is extended or adjusted under 35 U.S.C. 154(b) by 165 days.

(21) Appl. No.: 12/213,435

(22) Filed: Jun. 19, 2008

(65) Prior Publication Data

US 2008/0317458 A1  Dec. 25, 2008

(30) Foreign Application Priority Data

Jun. 22, 2007  (JP) ................................. 2007-164573

(51) Int. Cl.
*G03B 17/48* (2006.01)
*G06F 21/00* (2006.01)
*H04N 7/167* (2011.01)

(52) U.S. Cl. ......................... 396/429; 380/201; 713/185

(58) Field of Classification Search .................. 396/429, 396/661; 713/185, 172, 192, 193; 380/200, 380/201, 223, 228; 360/60; 340/5.65; 348/345
See application file for complete search history.

(56) References Cited

U.S. PATENT DOCUMENTS

| 2004/0105008 A1* | 6/2004 | Yamazaki | 348/221.1 |
| 2008/0205642 A1* | 8/2008 | Yururi | 380/200 |
| 2009/0122149 A1* | 5/2009 | Ishii | 348/222.1 |

FOREIGN PATENT DOCUMENTS

| JP | A 2001-326841 | 11/2001 |
| JP | A 2005-11151 | 1/2005 |
| JP | A 2005-216205 | 8/2005 |

* cited by examiner

*Primary Examiner* — Clayton E LaBalle
*Assistant Examiner* — Autumn Parker
(74) *Attorney, Agent, or Firm* — Oliff & Berridge, PLC

(57) ABSTRACT

A camera system includes: a digital camera; and a key device configured as a unit separate from the digital camera. The digital camera includes a control device that sets a lock mode for encrypting image data and recording the encrypted image data into a recording medium and clears the lock mode in response to a lock release signal input via the key device.

11 Claims, 8 Drawing Sheets

CAMERA SYSTEM AND DIGITAL CAMERA

INCORPORATION BY REFERENCE

The disclosure of the following priority application is herein incorporated by reference:

Japanese Patent Application No. 2007-164573 filed Jun. 22, 2007

BACKGROUND OF THE INVENTION

1. Field of the Invention

The present invention relates to a digital camera and a camera system equipped with a security function.

2. Description of Related Art

A plurality of sets of image data can be recorded into a detachable recording medium (such as a memory card) that may be loaded into a digital camera or a permanent recording medium installed as a built-in storage device in the digital camera. If the camera with a recording medium loaded therein or with built-in storage is lost or stolen, a third party will be easily able to access the images in the recording medium and may abuse them. In recent years, the capacity of recording media has increased greatly, allowing a large number of images to be recorded into a given recording medium. If such a recording medium ends up in the wrong hands, significant mischief may be done.

The need to effectively prevent unauthorized use of images or devices is addressed in Japanese Laid Open Patent Publication No. 2005-11151, which discloses a memory card that requires a password-based user authentication and in Japanese Laid Open Patent Publication No. 2005-216205, which discloses a system that executes a fingerprint-based user authentication.

However, the password-based authentication requires the user to enter his password each time he wishes to use the recording medium and is, therefore, inconvenient. There is an added concern that if the user forgets the password, he can no longer use the recording medium. Fingerprint authentication or palm print authentication requires the user to preregister his fingerprint or palm print and the user may find the task of preregistration inconvenient. Furthermore, since a fingerprint or palm print reading device must be installed in the system, the camera system is bound to become bigger and more complicated.

SUMMARY OF THE INVENTION

A camera system according to a first aspect of the present invention includes: a digital camera; and a key device configured as a unit separate from the digital camera, wherein: the digital camera comprises a control device that sets a lock mode for encrypting image data and recording the encrypted image data into a recording medium and clears the lock mode in response to a lock release signal input via the key device.

According to a second aspect of the present invention, in the camera system according to the first aspect, it is preferable that the control device judges compatibility of the key device with the digital camera based upon information input from the key device and does not respond to the lock release signal input from the key device if the key device is judged to be incompatible with the digital camera.

According to a third aspect of the present invention, in the camera system according to the first aspect, it is preferable that the control device sets the lock mode in response to a lock signal input from the key device.

According to a fourth aspect of the present invention, in the camera system according to the first aspect, the control device may set the lock mode as an image recording medium is loaded into the digital camera.

According to a fifth aspect of the present invention, in the camera system according to the first aspect, it is preferable that, after setting the lock mode, the control device encrypts unencrypted image data among image data already recorded in the recording medium and rerecords the newly encrypted image data.

According to a sixth aspect of the present invention, in the camera system according to the fifth aspect, the control device may encrypt the image data already recorded in the recording medium and rerecord the encrypted image data only in response to a user instruction.

According to a seventh aspect of the present invention, in the camera system according to the first aspect, after setting the lock mode, the control device may prohibit transfer of image data recorded in the recording medium to an external recipient.

According to a eighth aspect of the present invention, in the camera system according to the seventh aspect, the control device may prohibit transfer of the image data to an external recipient only in response to a user instruction.

A digital camera according to a ninth aspect of the present invention includes a control device that sets a lock mode for encrypting image data and recording the encrypted image data into a recording medium and clears the lock mode in response to a signal input from a separate device.

According to a tenth aspect of the present invention, in the camera system according to the first aspect, the digital camera may further include an image sensor that captures a subject image; and after setting the lock mode, the control device may encrypt image data of an image captured at the image sensor and record the encrypted image data into the recording medium.

According to a eleventh aspect of the present invention, in the camera system according to the first aspect, it is preferable that the digital camera further includes a digital terminal; and that the key device includes a connector terminal via which the key device is connected with the digital camera, and transmits the lock release signal to the digital camera while the connector terminal is connected to the digital terminal of the digital camera.

DESCRIPTION OF PREFERRED EMBODIMENT

In reference to FIGS. 1 through 7, an embodiment of the present invention is described.

Figure 1:
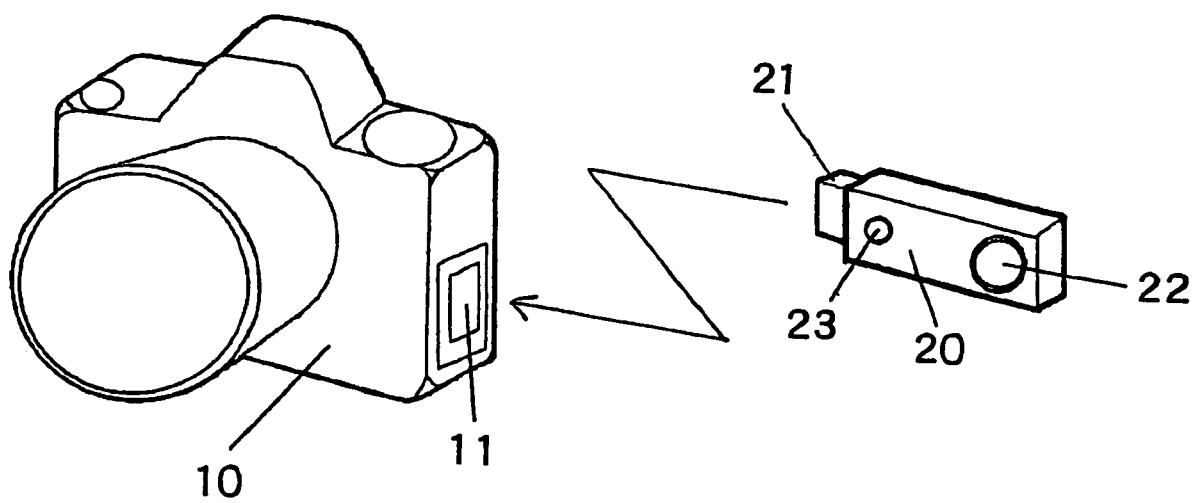
FIG. 1 is a perspective of a camera system achieved in an embodiment of the present invention.

FIG. 1 presents an external view of a camera system including a digital camera 10 and a key device 20. The key device 20, via which security-related instructions are issued to the camera 10, is an accessory included in the package when the camera 10 is purchased. As explained later, the key device 20 can be used only in conjunction with the particular camera 10 with which it is packaged.

Figure 2:
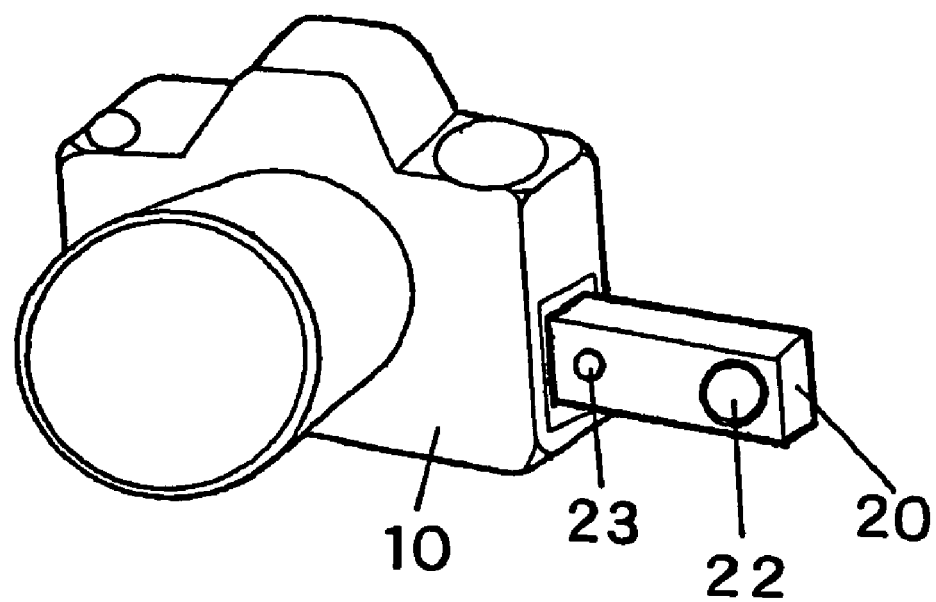
FIG. 2 shows a camera with a key device inserted therein.

As shown in the figure, a connector terminal portion 21, an operation button (push-button) 22 and an indicator element 23 (e.g., an LED) are disposed at the body of the key device 20. As the terminal portion 21 of the key device 20 is inserted at a terminal hole 11 of the camera 10, as shown in FIG. 2, the camera 10 and the key device 20 become electrically connected with each other, enabling power from the camera 10 to be supplied to the key device 20 and signal exchange between the camera 10 and the key device 20. It is desirable that a standard digital terminal, such as a USB terminal, at the camera 10, be used as the terminal hole 11 of the camera 10 instead of providing a special terminal hole to be exclusively used in conjunction with the key device 20.

Figure 3A:
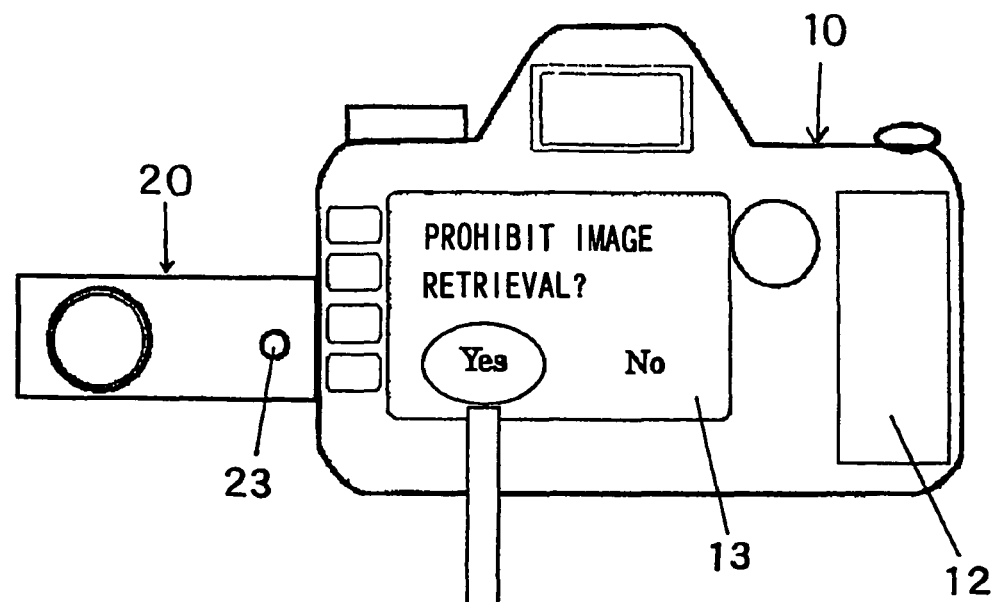
FIGS. 3A and 3B present an example of a display that may be brought up at the rear side of the camera when setting the lock mode.
Figure 3B:
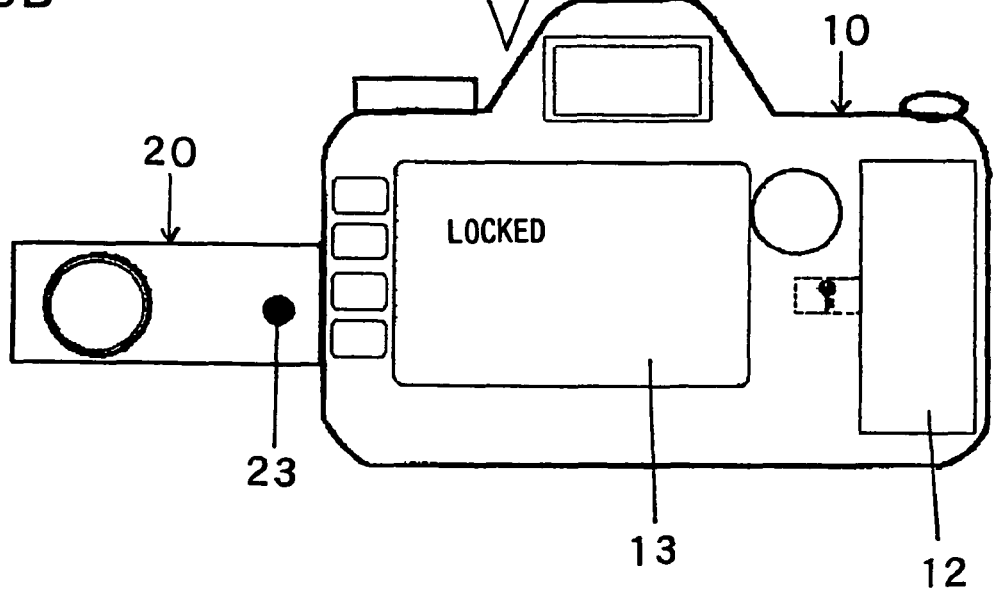

FIGS. 3A and 3B each present a rear view of the camera 10. At the camera rear surface, a card slot lid (hereinafter referred to as a card lid) 12 is disposed and as the card lid 12 is opened, a memory card MC (see FIG. 4) can be loaded/unloaded at the card slot. In the embodiment, the card lid 12 can be locked in a closed state while a memory card MC is loaded in the card slot. Once the card lid 12 is locked, the memory card MC cannot be removed from the card slot unless the lock is released through a specific method, as detailed later.

In addition, a display unit constituted with a liquid crystal monitor 13 is disposed at the rear surface of the camera 10. Image data recorded in the memory card MC can be displayed at the liquid crystal monitor 13. A menu screen of the camera 10, various warning messages and the like, too, are brought up on display at the liquid crystal monitor 13.

Figure 4:
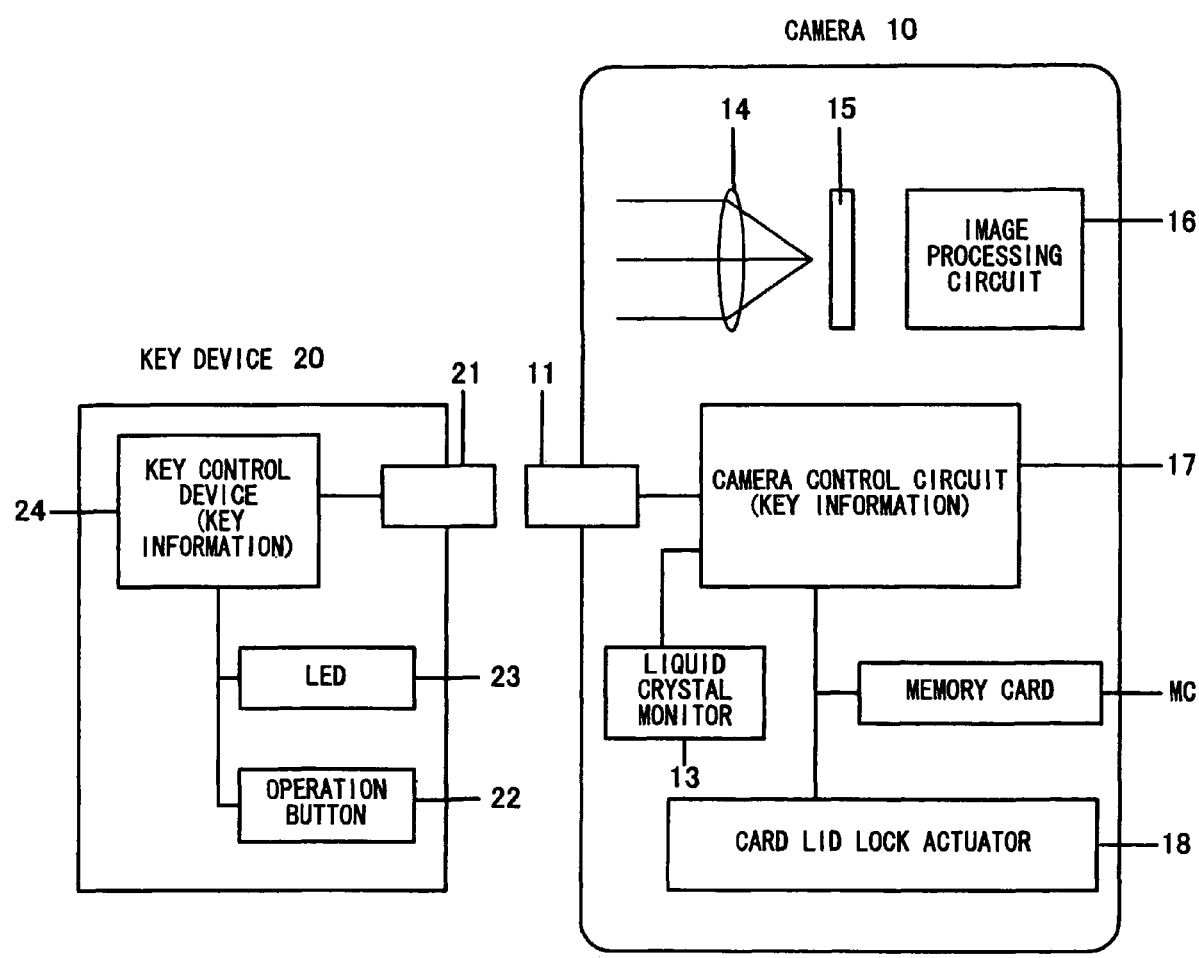
FIG. 4 is a control block diagram of the camera system.

FIG. 4 is a schematic block diagram of the camera 10 and the key device 20. An image formed with a subject light flux transmitted through a photographic lens 14 is captured and undergoes photoelectric conversion at an image sensor 15. An image processing circuit 16 generates image data by executing various types of processing on the output from the image sensor 15 resulting from the photoelectric conversion and the image data thus generated are recorded into the memory card MC via a camera control circuit 17. The liquid crystal monitor 13 mentioned earlier and an actuator 18 with which the card lid 12 is locked/unlocked are connected to the camera control circuit 17.

A key control circuit 24 installed in the key device 20 transmits a signal indicating whether or not the operation button 22 has been operated to the camera 10 and executes ON control for the LED 23 constituting the indicator element in response to an instruction issued by the camera 10.

The security function of the camera 10, achieved by utilizing the key device 20, is now explained.

If a camera 10 having no security means which is loaded with the memory card MC is lost or stolen and ends up in the hands of a stranger, that person will be able to freely view the images recorded in the memory MC and may decide to abuse those images.

Accordingly, the image data are encrypted and the encrypted image data are recorded into the memory card MC by setting the camera 10 in a lock mode via the key device 20 in the embodiment. While the encryption is executed by using a preinstalled encryption key (software key) within the camera 10, different encryption keys are installed in individual cameras and thus, the encryption key in the camera 10 is unique to the particular camera. In other words, the encrypted image data can only be decrypted in the camera where they were initially encrypted. The image data cannot be displayed as images without first being decrypted. In order to decrypt the image data, the key device 20 corresponding to the camera 10 must be used. In addition, the camera 10 in the embodiment assumes a structure that allows image data previously recorded in the memory card MC to be encrypted as necessary and also allows the card lid 12 to be locked/unlocked as necessary.

Figure 5:
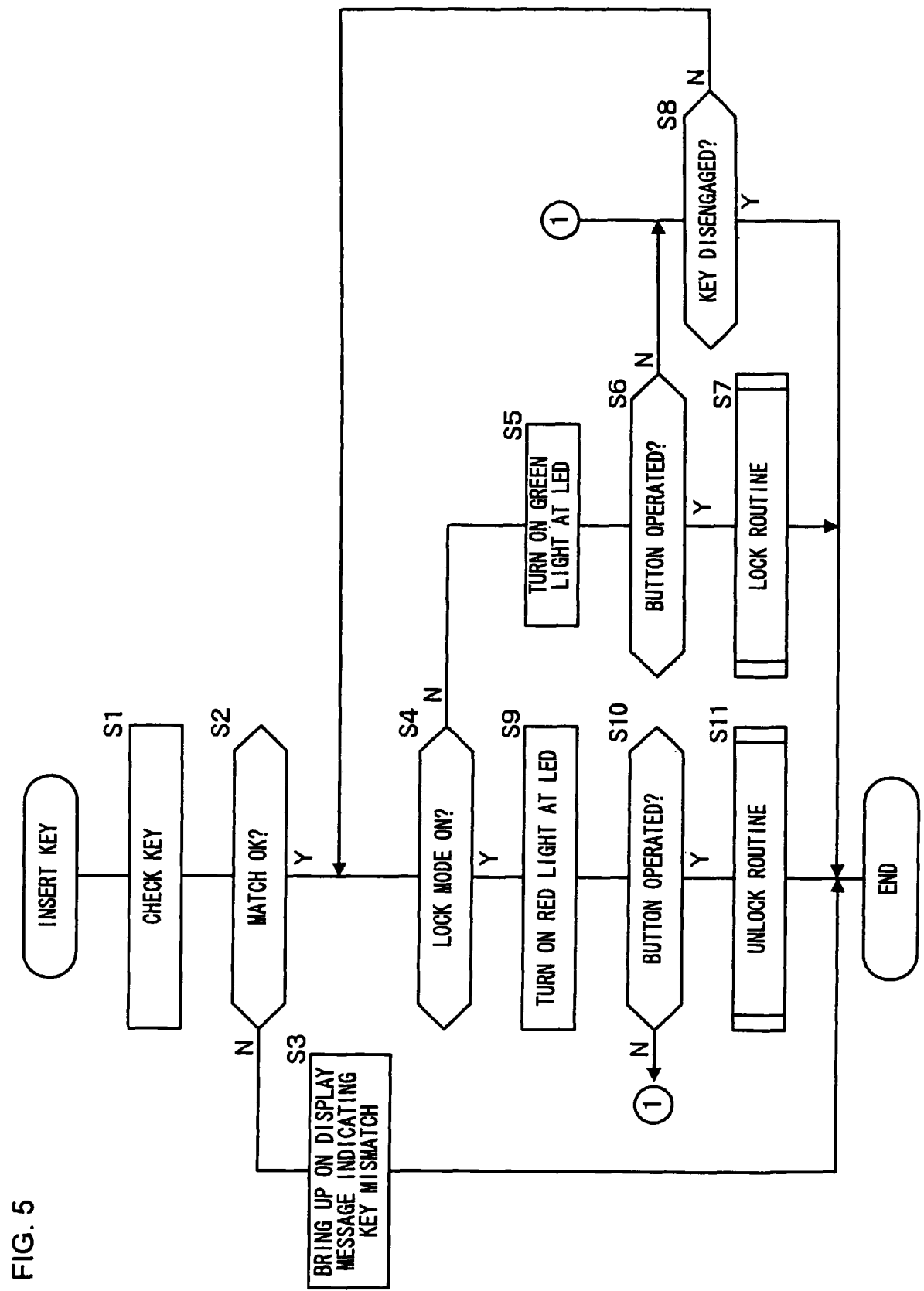
FIG. 5 presents a flowchart of the camera operation executed as the key device is inserted at the camera.
Figure 6:
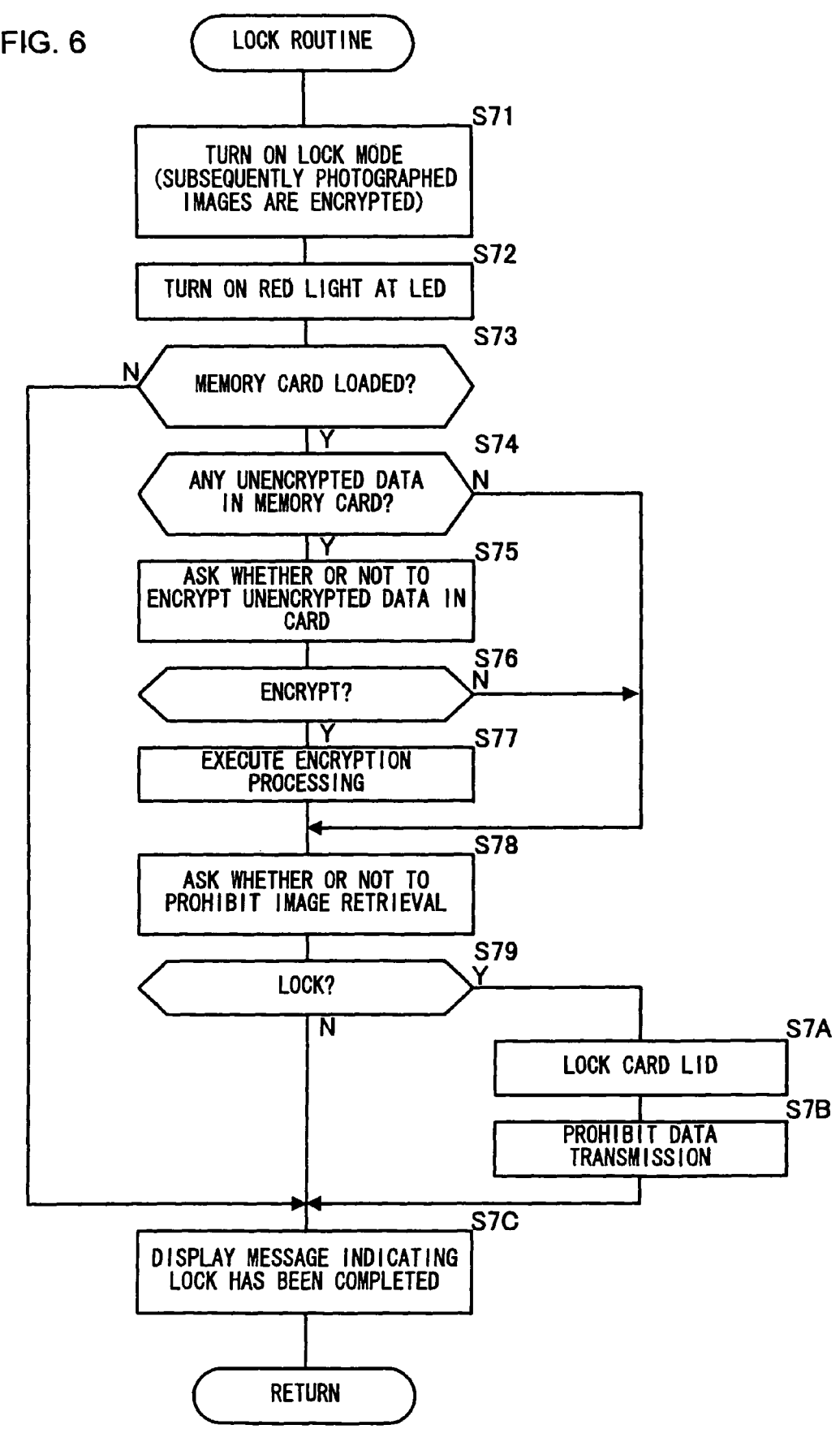
FIG. 6 presents a detailed flowchart of the lock routine in FIG. 5.
Figure 7:
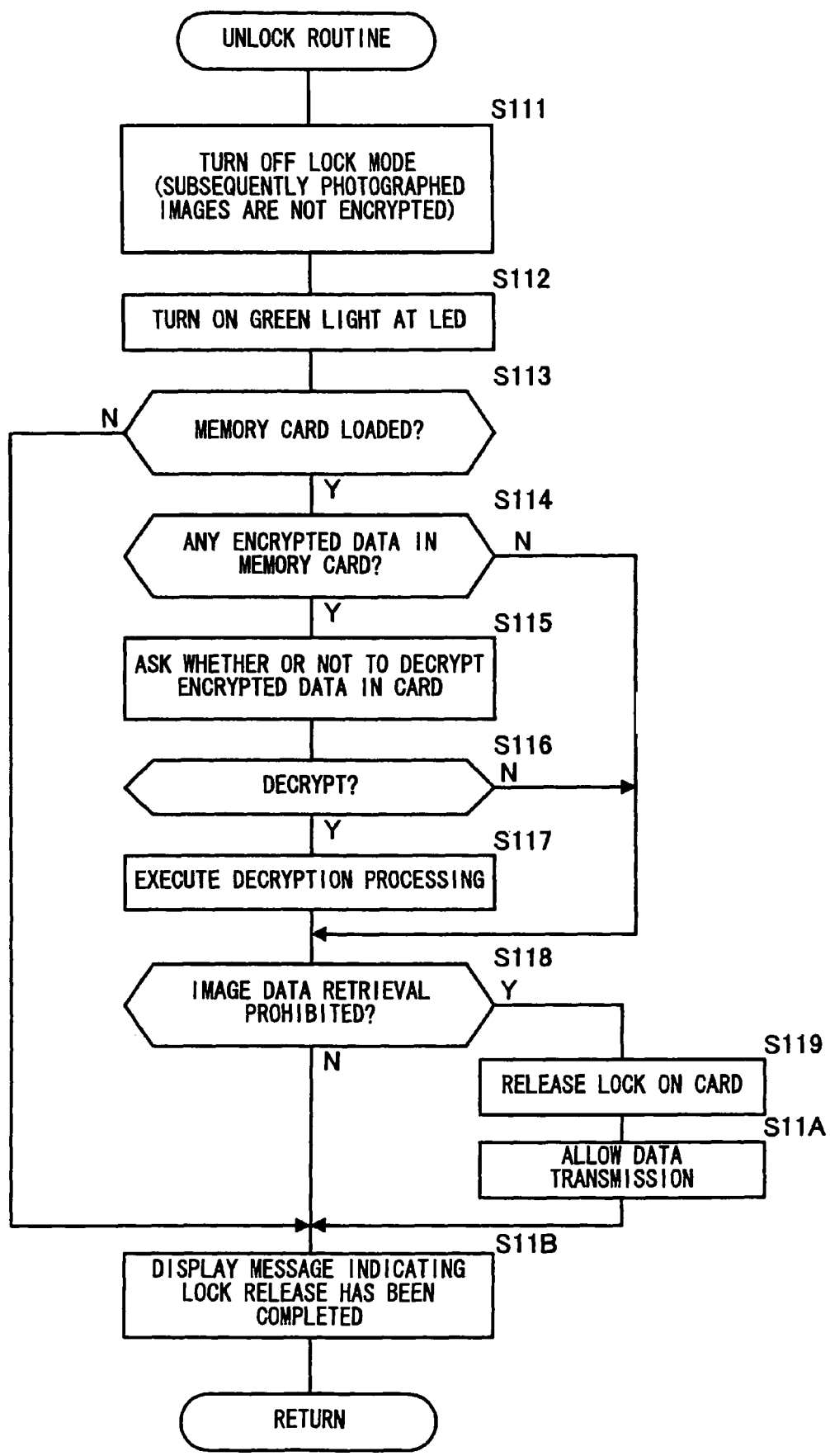
FIG. 7 presents a detailed flowchart of the unlock routine in FIG. 5.

The following is a detailed explanation of the security function of the camera 10, given in reference to the flowcharts presented in FIGS. 5 through 7. FIGS. 5 through 7 illustrate the processing procedure executed based upon a lock mode setting control program for the camera 10.

Upon confirming that the key device 20 has been connected, i.e., the terminal portion 21 of the key device 20 has been inserted through the terminal hole 11 at the camera 10, the camera control circuit 17 starts up the program in FIG. 5. In step S1, the key device 20 is checked to determine whether or not it is the correct key device corresponding to the camera 10. For instance, if the identification number transmitted from the key device 20 matches the number recorded in a memory in the camera 10, a check OK decision is made in step S2 and the operation proceeds to step S4. If, on the other hand, the numbers do not match up, an NG decision is made in step S2 and the operation proceeds to step S3. In step S3, a message indicating a key mismatch, i.e., a message indicating that the inserted key device 20 is not the key device 20 that was included in the camera package, is brought up on display at the liquid crystal monitor 13, before the processing in FIG. 5 ends. It will be obvious that individual camera systems are all assigned with different identification numbers.

In step S4, a decision is made as to whether or not the camera 10 is currently set in the lock mode for encrypting image data and recording the encrypted image data. If it is decided that the lock mode is not currently selected, the operation proceeds to step S5 to turn on green light at the LED 23 of the key device 20 via the key control circuit 24. If it is decided that the lock mode is currently selected, the operation proceeds to step S9 to turn on a red light at the LED 23 of the key device 20 via the key control circuit 24. As the LED 23 is lit in a specific color as described above, the user is able to immediately ascertain whether or not the lock mode is selected.

In steps S6 and S10, to which the operation proceeds after turning on the LED 23 in step S5 and S9 respectively, a decision is made based upon a signal provided from the key control circuit 24 as to whether or not the operation button 22 at the key device 20 has been operated. If it is decided in step S6 that the operation button 22 has been operated, the operation shifts into a lock routine in step S7 to set the lock mode. If it is decided in step S10 that the operation button 22 has been operated, the operation shifts into an unlock routine in step S11 to clear the lock mode. It is to be noted that if it is decided in step S6 or step S10 that the operation button 22 has not been operated and it is verified in step S8 that the key device 20 has been taken out while the operation button 22 has remained unoperated, the processing in FIG. 5 ends.

FIG. 6 shows in detail the lock routine executed in step S7. In step S71, the camera 10 is set in the lock mode. Once the lock mode is set, the image data of images subsequently captured at the image sensor 15 are all encrypted and recorded as encrypted data. In step S72, the indicator light at the LED 23 is switched from green to red via the key control circuit 24, so as to notify the user that the lock mode has been selected.

After deciding in step S6 that the operation button 22 has been operated, the processing at the lock mode setting is continuously executed regardless of whether or not the key device 20 is connected to the camera 10. Accordingly, after the user, having operated the operation button 22 in order to select the lock mode, verifies that the indicator light color at the LED 23 has changed, the key device 20 may be immediately disconnected from the camera 10. The disconnected key device 20 should be stored at a location away from the camera 10. For instance, if the camera 10 is carried around in a bag, the key device 20 should not be stored in the bag. It is to be noted that once the key device 20 is disconnected, the power supply from the camera 10 to the key device 20 is turned off and thus, the LED 23 goes off.

In step S73, a decision is made as to whether or not the memory card MC is loaded in the card slot. If the memory card MC is not loaded in the card slot and thus a negative decision is made in step S73, a message indicating that the lock has been completed is brought up on display at the liquid crystal monitor 13 in step S7C, and then the operation makes a return. FIG. 3B presents a display example of the lock complete message brought up at the liquid crystal monitor 13.

If, on the other hand, the memory card MC is loaded in the card slot and thus an affirmative decision is made in step S73, the operation proceeds to step S74 to make a decision as to whether or not there are any unencrypted image data in the loaded memory card MC. If it is decided that there are no unencrypted image data, the operation proceeds to step S78. If, on the other hand, it is decided that unencrypted image data are present in the loaded memory card MC, the operation proceeds to step S75 to ask the user whether or not to encrypt the unencrypted data in the memory card MC. The inquiry to the user may be issued by, for instance, displaying an inquiry message at the liquid crystal monitor 13. At this point, the user selects Yes or No via, for instance, an operation unit located at the camera 10. If the user selects No, a negative decision is made in step S76 and the operation proceeds to step S78. If the user selects Yes, an affirmative decision is made in step S76 and the operation proceeds to step S77 to encrypt all the unencrypted data in the memory card MC and record the newly encrypted data in place of the previously unencrypted data.

Next, in step S78, an inquiry asking the user whether or not image data retrieval is to be prohibited is issued. FIG. 3A presents a display example of an inquiry message asking the user whether or not image data retrieval should be prohibited, which may be brought up on display at the liquid crystal monitor 13. In response, the user selects Yes or No via the operation unit disposed at the camera 10. If the user selects No, a negative decision is made in step S79 and the operation proceeds to step S7C, whereas if the user selects Yes, an affirmative decision is made in step S79 and the operation proceeds to step S7A. In step S7A, the card lid 12 is locked via the actuator 18, and in step S7B, data transmission from the memory card MC to a recipient outside the camera 10 is prohibited before the operation proceeds to step S7C. Once the card lid 12 is locked, the memory card MC can no longer be physically removed from the card slot. In addition, with data transmission prohibited, the data in the memory card MC can no longer be transferred to an external device, either through a wired connection or through a wireless connection.

While a sufficient level of security is normally assured simply through the image data encryption, an even higher level of security is achieved by choosing to prohibit image data retrieval as described above, since the prohibition on image data retrieval effectively thwarts any attempt to breach the security such as decrypting the image data with an outside computer or the like by transporting the image data from the camera 10 to the outside computer.

It is to be noted that if images are recorded into a fixed memory in the camera 10, e.g., a built-in memory, the image data retrieval can be prohibited simply by prohibiting data transmission.

Next, the unlock routine executed in step S11 is described. As described above, as the user inserts the key device 20 at the camera 10 in the lock mode and operates the operation button 22, the operation shifts into the unlock routine in step S11 to clear the lock mode. In step S111 in FIG. 7, providing a detailed flowchart of the unlock routine, the lock mode is cleared. Once the lock mode is cleared, the image data of images subsequently captured via the image sensor 15 are all recorded without undergoing encryption. In step S112, the indicator light at the LED 23 is switched from red to green via the key control circuit 24 so as to notify the user that the lock mode has been cleared.

In step S113, a decision is made as to whether or not the memory card MC is loaded in the card slot. If the memory card MC is not loaded in the card slot and thus a negative decision is made in step S113, a message indicating that the lock release has been completed is brought up on display at the liquid crystal monitor 13 in step S11B, and then the operation makes a return. If, on the other hand, the memory card MC is loaded in the card slot and thus an affirmative decision is made in step S113, the operation proceeds to step S114 to make a decision as to whether or not there are any encrypted image data in the memory card MC. If it is decided that there are no encrypted image data in the memory, the operation proceeds to step S118. If, on the other hand, it is decided that encrypted image data are present in the memory card MC, the operation proceeds to step S115 to ask the user whether or not to decrypt the encrypted data in the memory card MC. The inquiry to the user may be issued by, for instance, displaying an inquiry message at the liquid crystal monitor 13. At this point, the user selects Yes or No via, for instance, the operation unit located at the camera 10. If the user selects No in step S116, the operation proceeds to step S118. If the user selects Yes, the operation proceeds to step S117 to decrypt all the encrypted data in the memory card MC and record the newly decrypted data in place of the previously encrypted data.

Next, in step S118, a decision is made as to whether or not image data retrieval is currently prohibited. If image data retrieval is not prohibited, the operation proceeds to step S11B, whereas if image data retrieval is prohibited, the operation proceeds to step S119. In step S119, the lock on the card lid 12 is released via the actuator 18 and in step S11A, data transmission from the memory card MC to a recipient outside the camera 10 is enabled, before the operation proceeds to step S11B.

In the embodiment described above, the lock mode for encrypting image data and recording the encrypted image data can be set or cleared simply by inserting the key device 20, provided as a separate accessory to the camera 10, into the camera 10 and then performing a simple operation. In other words, it does not require any time-consuming user operation such as password entry. In addition, since the user does not need to remember a password, the user never has to deal with the frustrating situation in which the user having forgotten the password cannot use the camera. Since there is no need to preregister a fingerprint or palm print, the camera does not require a fingerprint/palm print reader and thus the camera mechanism does not become over-complex or over-large. Since pictures can be taken in the lock mode without having to release the lock for a photographing operation, the lock does not need to be released frequently and thus, better ease of use is assured.

It is desirable that the manufacturer keep the serial number assigned to the camera 10 together with information on the encryption key stored in the camera in case the key device 20 gets lost. Under such circumstances, the user having lost the key device 20 will be able to access the management site run by the manufacturer from his computer via the Internet and transmit the camera serial number and personal information. Once verifying that the user is an authorized user, the manufacturer will return information corresponding to the received serial number to the user from the manufacturer's site. The user will then be able to clear the lock mode by transferring the information provided from the manufacturer's site to the camera through a USB connection or the like.

Figure 8:
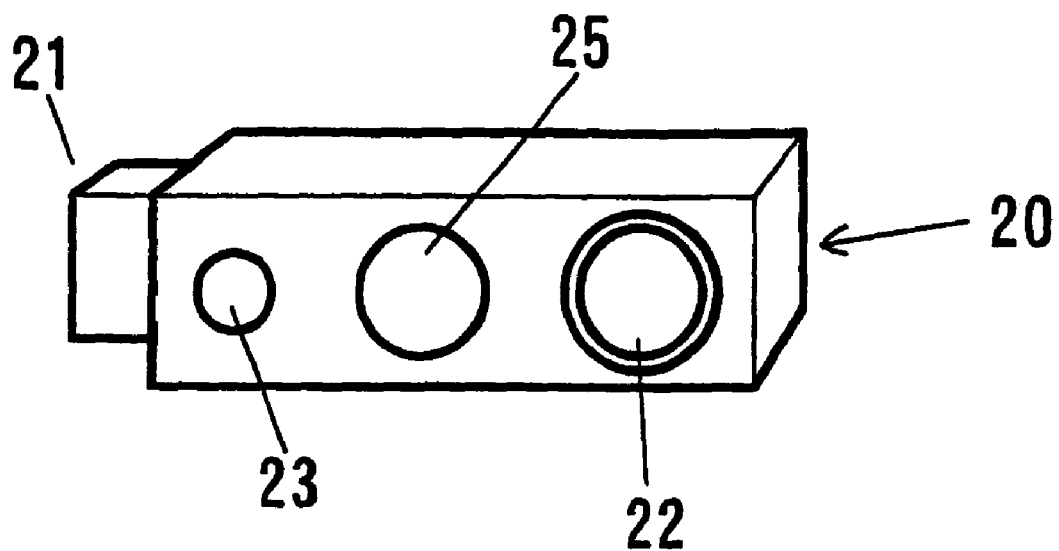
FIG. 8 is a perspective showing another example of the key device.

FIG. 8 presents an example of a key device 20 that includes an operation button 25. The operation button 25, via which data retrieval prohibit/cancel instructions are issued, is operated to prohibit image data retrieval or cancel a prohibition on image data retrieval without changing the encryption setting. For instance, when the lock mode is set and image data retrieval is prohibited, the user, wishing to unload the memory card MC without changing the encryption setting simply needs to insert the key device 20 at the camera 10 and operate the operation button 25 to release the lock on the card lid 12. When image data retrieval is enabled, the user wishing to prohibit data retrieval without altering the encryption setting simply needs to insert the key device 20 at the camera 10 and operate the operation button 25 to prohibit data retrieval.

It is to be noted that custom settings for encryption/decryption of image data in the memory card MC and the image data retrieval prohibit/cancel may be selected in advance. For instance, one of the following options (A1)~(A3) may be selected with regard to the encryption of images in the memory card. The options (A1)~(A3) may be displayed in a menu setting screen at the liquid crystal monitor 13 to allow the user to select one of them.
(A1) image data in the memory card are always encrypted
(A2) image data in the memory card are not encrypted
(A3) confirmation is required each time If the user has selected the option (A1), the operation proceeds directly to step S77 upon making an affirmative decision in step S74 in FIG. 6. If the user has selected the option (A2), steps S74~S77 in the flowchart in FIG. 6 are skipped, whereas if the user has selected the option (A3), the processing is executed exactly as shown in the flowchart presented in FIG. 6.

Image data may be decrypted under similar control.

Likewise, one of the following options (B1)~(B3) may be selected with regard to image data retrieval prohibition.
(B1) image retrieval is always prohibited
(B2) image retrieval is not prohibited
(B3) confirmation is required each time If the user has selected the option (B1), the operation proceeds to step S7 by skipping steps S78 and S79 in FIG. 6. If the user has selected option (B2), steps S78~S7B in FIG. 6 are skipped. If the user has selected the option (B3), the processing is executed exactly as shown in the flowchart presented in FIG. 6.

Image data retrieval may be enabled under control similar to that described above.

In addition, while an explanation is given above on an example in which the lock mode is both set and cleared via the key device 20, the lock mode may instead be set without utilizing the key device 20. For instance, as the memory card MC is loaded and the card lid 12 is closed, the camera 10 may automatically enter the lock mode. In this case too, the lock mode should be cleared via the key device 20 as in the example described earlier.

The security level may be further raised by adopting a structure in which after inserting the key device 20 at the camera 10, the user is required to operate a plurality of buttons at the key device 20 in a predetermined sequence in order to clear the lock mode.

Furthermore, while an explanation is given above on an example in which the lock mode is set/cleared as the operation button 22 is operated after inserting the key device 20 at the camera 10, the lock mode may instead be set/cleared by turning the key device 20 having been inserted in the camera by a predetermined degree relative to the camera 10 around the axis extending along the insertion direction. Alternatively, the lock mode may be set/cleared simply by inserting the key device 20. The key device 20 may be a non-contact type device, with which the lock mode is set/cleared as a light signal is radiated onto a light receiving portion located at, for instance, the camera.

In the embodiment described above in reference to the flowcharts presented in FIGS. 6 and 7, the encryption processing and the like are executed on image data of images captured at the image sensor 15 of the digital camera 10. However, the present invention is not limited to this example and image data other than those of images captured at the image sensor 15 may undergo the encryption processing or the like in the digital camera 10. For instance, the digital camera 10 may adopt a structure that enables it to encrypt data of images or the like taken in from an external source and then record the encrypted data into a recording medium.

The embodiment of the present invention described above provides a camera system that assures a highly advanced security function without requiring a tedious password entry process, fingerprint registration or a special reader device.

The above described embodiment is an example and various modifications can be made without departing from the scope of the invention.

What is claimed is:
1. A camera system, comprising:
a digital camera; and
a key device configured as a unit separate from the digital camera, wherein:
the digital camera comprises a control device that sets a lock mode for encrypting image data and recording the encrypted image data into a recording medium and clears the lock mode in response to a lock release signal input via the key device.
2. A camera system according to claim 1, wherein:
the control device judges compatibility of the key device with the digital camera based upon information input from the key device and does not respond to the lock release signal input from the key device if the key device is judged to be incompatible with the digital camera.
3. A camera system according to claim 1, wherein:
the control device sets the lock mode in response to a lock signal input from the key device.
4. A camera system according to claim 1, wherein:
the control device sets the lock mode as an image recording medium is loaded into the digital camera.
5. A camera system according to claim 1, wherein:
after setting the lock mode, the control device encrypts unencrypted image data among image data already recorded in the recording medium and rerecords the newly encrypted image data.
6. A camera system according to claim 5, wherein:
the control device encrypts the image data already recorded in the recording medium and rerecords the encrypted image data only in response to a user instruction.

7. A camera system according to claim 1, wherein:
after setting the lock mode, the control device prohibits transfer of image data recorded in the recording medium to an external recipient.
8. A camera system according to claim 7, wherein:
the control device prohibits transfer of the image data to an external recipient only in response to a user instruction.
9. A camera system according to claim 1, wherein:
the digital camera further comprises an image sensor that captures a subject image; and
after setting the lock mode, the control device encrypts image data of an image captured at the image sensor and records the encrypted image data into the recording medium.

10. A camera system according to claim 1, wherein:
the digital camera further comprises a digital terminal; and
the key device comprises a connector terminal via which the key device is connected with the digital camera, and transmits the lock release signal to the digital camera while the connector terminal is connected to the digital terminal of the digital camera.
11. A digital camera, comprising:
a control device that sets a lock mode for encrypting image data and recording the encrypted image data into a recording medium and clears the lock mode in response to a signal input from a separate device.

* * * * *